United States Patent
Zhao et al.

(10) Patent No.: US 11,427,102 B2
(45) Date of Patent: Aug. 30, 2022

(54) SYSTEM AND METHOD OF AUTONOMOUSLY CHARGING AN ELECTRIC VEHICLE

(71) Applicant: GM Global Technology Operations LLC, Detroit, MI (US)

(72) Inventors: Xiang Zhao, Novi, MI (US); Ningjian Huang, Bingham Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 17/082,337

(22) Filed: Oct. 28, 2020

(65) Prior Publication Data

US 2022/0126718 A1    Apr. 28, 2022

(51) Int. Cl.
*B60L 53/60* (2019.01)
*H02J 7/00* (2006.01)
*B60L 53/16* (2019.01)

(52) U.S. Cl.
CPC ............... *B60L 53/60* (2019.02); *B60L 53/16* (2019.02); *H02J 7/00032* (2020.01); *H02J 7/0045* (2013.01)

(58) Field of Classification Search
CPC ...... B60L 53/60; B60L 53/16; H02J 7/00032; H02J 7/0045
USPC ............................................................ 320/109
See application file for complete search history.

(56) References Cited

U.S. PATENT DOCUMENTS

| | | | | |
|---|---|---|---|---|
| 8,169,186 B1* | 5/2012 | Haddad | ............... | B60L 53/65 180/205.1 |
| 9,056,555 B1* | 6/2015 | Zhou | ............... | B60L 53/35 |
| 10,576,833 B2* | 3/2020 | Malek | ............... | B60L 53/62 |
| 10,696,167 B2* | 6/2020 | Wetzel | ............... | B60L 53/305 |
| 2011/0077809 A1* | 3/2011 | Leary | ............... | B60L 53/14 320/109 |
| 2011/0254504 A1* | 10/2011 | Haddad | ............... | B60L 53/665 320/109 |

(Continued)

FOREIGN PATENT DOCUMENTS

| | | | | |
|---|---|---|---|---|
| CN | 108146283 A | * | 6/2018 | |
| CN | 110356276 A | * | 10/2019 | ............ B60L 53/36 |

(Continued)

*Primary Examiner* — Suresh Memula
(74) *Attorney, Agent, or Firm* — Vivacqua Crane, PLLC

(57) ABSTRACT

A method of autonomously charging an electric vehicle having a charge port is provided. The method comprises providing an electric charge system having a first controller and a second controller. The first controller is in communication with an electric charger and a movable charge arm. The movable charge arm is connected to the electric charger extends to an arm end comprising a charge plug and a camera. The movable charge arm has an idle position defining a charging zone and is movable via a predetermined number of degrees of freedom to connect the charge plug with the charge port for electrically charging the electric vehicle. The second controller disposed in the vehicle and in communication with the first controller. The method further comprises aligning the charge port with the charging zone by vehicle movement and aligning the charge plug with the charge port by the charge arm movement. The method further comprises connecting the charge plug to the charge port to electrically charge the electric vehicle.

20 Claims, 4 Drawing Sheets

(56) References Cited

U.S. PATENT DOCUMENTS

| | | | |
|---|---|---|---|
| 2013/0076902 A1* | 3/2013 | Gao | B60L 53/35 348/148 |
| 2014/0067660 A1* | 3/2014 | Cornish | B60L 53/305 705/39 |
| 2014/0217966 A1* | 8/2014 | Schneider | H02J 7/025 320/108 |
| 2015/0042278 A1* | 2/2015 | Leary | B60L 53/126 901/30 |
| 2017/0008411 A1* | 1/2017 | Wu | B60L 58/12 |
| 2017/0106762 A1* | 4/2017 | Dow | B60L 53/36 |
| 2017/0106763 A1* | 4/2017 | Dow | B60L 53/305 |
| 2017/0136891 A1* | 5/2017 | Ricci | B60L 5/18 |
| 2017/0225578 A1* | 8/2017 | Paryani | B60L 53/36 |
| 2018/0015836 A1* | 1/2018 | Madon | B60L 53/65 |
| 2018/0154785 A1* | 6/2018 | Wetzel | B60L 53/22 |
| 2020/0009978 A1* | 1/2020 | Shin | B60L 53/66 |
| 2020/0016760 A1* | 1/2020 | Lee | B25J 9/1697 |
| 2020/0361331 A1* | 11/2020 | Shin | B60L 53/37 |
| 2021/0001737 A1* | 1/2021 | Hoess | H01R 13/5213 |
| 2021/0086643 A1* | 3/2021 | Satheesh Babu | B60L 53/14 |
| 2021/0101496 A1* | 4/2021 | Brendel | B60L 53/37 |
| 2021/0276433 A1* | 9/2021 | Mandel-Senft | B60L 53/305 |
| 2022/0001761 A1* | 1/2022 | Cole | G06V 10/143 |
| 2022/0055491 A1* | 2/2022 | Labell | B60L 53/18 |

FOREIGN PATENT DOCUMENTS

| | | | | |
|---|---|---|---|---|
| CN | 107107880 B | * | 11/2019 | B25J 11/00 |
| CN | 210680427 U | | 6/2020 | |
| CN | 211595531 U | * | 9/2020 | |
| CN | 111867877 A | * | 10/2020 | B60L 3/0015 |
| CN | 211617458 U | * | 10/2020 | |
| CN | 211764977 U | * | 10/2020 | |
| CN | 211969196 U | * | 11/2020 | B60L 53/14 |
| CN | 112008706 A | * | 12/2020 | B25J 11/00 |
| CN | 113085609 A | * | 7/2021 | |
| CN | 214564678 U | * | 11/2021 | |
| CN | 214564686 U | * | 11/2021 | |
| CN | 214874265 U | * | 11/2021 | |
| DE | 102012216980 A1 | * | 4/2013 | B25J 13/085 |
| DE | 102017009237 A1 | | 4/2018 | |
| DE | 102018104759 A1 | * | 9/2019 | B60L 3/0015 |
| DE | 102018104762 A1 | * | 9/2019 | B60L 53/16 |
| DE | 102019105466 B3 | * | 8/2020 | B25J 9/1692 |
| DE | 102020000330 A1 | * | 10/2020 | |
| EP | 3647107 A1 | * | 5/2020 | B60L 53/14 |
| KR | 20220007624 A | * | 4/2020 | |
| WO | WO-2016012184 A1 | * | 1/2016 | B60L 11/1827 |
| WO | WO-2016096194 A1 | * | 6/2016 | B60L 11/1835 |
| WO | WO-2019166234 A1 | * | 9/2019 | B60L 53/16 |
| WO | WO-2019166519 A1 | * | 9/2019 | B60L 3/0015 |
| WO | WO-2020159027 A1 | * | 8/2020 | B25J 11/00 |
| WO | WO-2021167462 A2 | * | 8/2021 | |
| WO | WO-2021217984 A1 | * | 11/2021 | B60L 53/16 |

* cited by examiner

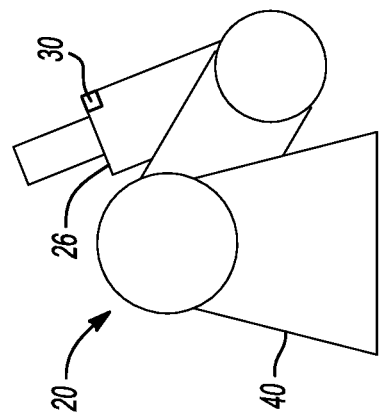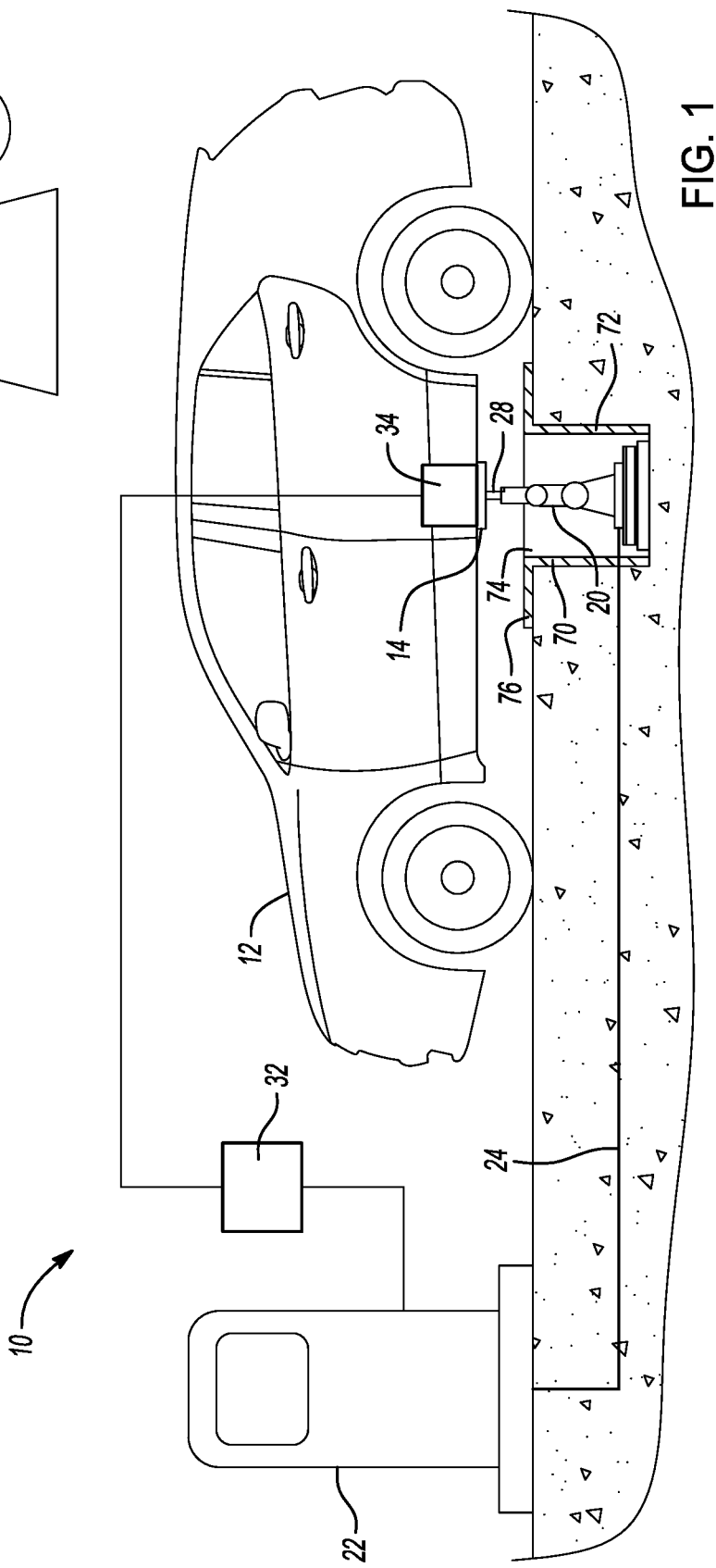

SYSTEM AND METHOD OF AUTONOMOUSLY CHARGING AN ELECTRIC VEHICLE

INTRODUCTION

The present disclosure relates to charging apparatus for vehicles and, more particularly, autonomous charging systems and methods for charging electric vehicles.

As electric vehicles are growing more common in the industry, charging apparatus for charging electric vehicles are being improved. Current charging apparatus such as wireless charging experience relatively high energy loss and low efficiency. Moreover, current apparatus are high in weight resulting in high manufacturing and operational costs.

SUMMARY

Thus, while current apparatus achieve their intended purposes, there is a need for a new and improved system and method for autonomously charging electric vehicles.

In one aspect of the present disclosure, a method of autonomously charging an electric vehicle having a charge port is disclosed. The method comprises providing an electric charge system having a first controller and a second controller. The first controller is in communication with an electric charger and a movable charge arm. The movable charge arm is connected to the electric charger and extends to an arm end. The arm end comprises a charge plug and a camera. The movable charge arm has an idle position defining a charging zone and is movable via a predetermined number of degrees of freedom to connect the charge plug with the charge port for electrically charging the electric vehicle. The second controller is disposed in the vehicle and is in communication with the first controller.

The method further comprises aligning the charge port with the charging zone by vehicle movement and aligning the charge plug with the charge port by the charge arm movement. The method further comprises connecting the charge plug to the charge port to electrically charge the electric vehicle.

In one example of this aspect of the present disclosure, the step of aligning the charge port with the charging zone comprises sending a first signal to the first controller when the charge port is aligned with the charging zone. Moreover, the step of aligning the charge port with the charging zone comprise, when the first signal is received, moving the charge arm from the idle position towards the charge port to align the charge plug with the charge port.

In another example, the step of connecting the charge plug to the charge port comprises connecting the charge plug to the charge port when the charge plug is aligned with the charge port.

In another example, the step of connecting the charge plug to the charge port comprises sending a second signal to the first controller when charging is complete and, when the second signal is received, moving the charging arm to the idle position.

In yet another example of this aspect, the predetermined number of degrees of freedom of the movable charge arm is 3. In another example, the predetermined number of degrees of freedom of the movable charge arm is 4.

In still another example, the movable charge arm is disposed in an underground enclosure in the idle position. In this example, the underground enclosure has a housing with an open end for the movable charging arm to move from the idle position to a charging position. Moreover, the open end includes a movable cover having a closed state when the charging arm is in the idle position and an open state when the charging arm is to be moved to the charging position.

In another aspect of the present disclosure, a method of autonomously charging an electric vehicle having a charge port is provided. The method comprises providing an electric charge system having a first controller and a second controller. The first controller is in communication with an electric charger and a movable charge arm. The movable charge arm is connected to the electric charger. The movable charge arm extends to an arm end. The arm end comprises a charge plug and a camera. The movable charge arm has an idle position defining a charging zone and being movable via a predetermined number of degrees of freedom to connect the charge plug with the charge port for electrically charging the electric vehicle. The second controller is disposed in the vehicle and in communication with the first controller.

The method further comprises aligning the charge port with the charging zone by vehicle movement and sending a first signal to the first controller when the charge port is aligned with the charging zone. Moreover, the method further comprises, when the first signal is received, moving the charge arm from the idle position towards the charge port to align the charge plug with the charge port. The method further comprises connecting the charge plug to the charge port to electrically charge the electric vehicle.

In another example, the step of connecting the charge plug to the charge port comprises connecting the charge plug to the charge port to electrically charge the electric vehicle when the charge plug is aligned with the charge port, and sending a second signal to the first controller when charging is complete. The step of connecting the charge plug to the charge port further comprises, when the second signal is received, moving the charging arm to the idle position.

In another example, the predetermined number of degrees of freedom of the movable charge arm is 3. In another example, the predetermined number of degrees of freedom of the movable charge arm is 4.

In another aspect of the present disclosure, a system for autonomously charging an electric vehicle having a charge port is disclosed. The system comprises a first controller in communication with a second controller disposed in the vehicle. The system further comprises a movable charge arm connected to an electric charger for powering the movable charge arm. The movable charge arm extends to an arm end comprising a charge plug and a camera. The movable charge arm has an idle position defining a charging zone and is movable via a predetermined degrees of freedom to connect the charge plug with the charge port for electrically charging the electric vehicle.

The system further comprises a first controller in communication with the electric charger and the movable charge arm, and a second controller disposed in the vehicle and in communication with the first controller. In this aspect, the charge port is configured to be aligned with the charging zone by vehicle movement and the charge plug is configured to be aligned with the charge port by movement of the charge arm. In this aspect of the present disclosure, the charge plug is configured to be connected to the charge port to electrically charge the electric vehicle.

In one example of this aspect, the second controller is configured to send a first signal to the first controller when the charge port is aligned with the charging zone. Moreover, the charge arm is configured to move from the idle position towards the charge port to align the charge plug with the charge port when the first signal is received.

In another example, r the charge arm is configured to connect the charge plug to the charge port when the charge plug is aligned with the charge port.

In another example, the second controller is configured to send a second signal to the first controller when charging is complete and the charge arm is configured to move to the idle position when the second signal is received.

In yet another example, the predetermined number of degrees of freedom of the movable charge arm is 3. Moreover, the predetermined number of degrees of freedom of the movable charge arm is 4.

In still another example, the movable charge arm is disposed in an underground enclosure in the idle position. The underground enclosure has a housing with an open end for the movable charging arm to move from the idle position to a charging position. Moreover, the open end includes a movable cover having a closed state when the charging arm is in the idle position and an open state when the charging arm is to be moved to the charging position.

In yet another example, the movable charge arm is disposed in an above ground enclosure in the idle position. The above-ground enclosure has a housing with an open end for the movable charging arm to move from the idle position to a charging position. The open end includes a movable cover having a closed state when the charging arm is in the idle position and an open state when the charging arm is to be moved to the charging position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic view of a system for autonomously charging an electric vehicle in accordance with one embodiment of the present disclosure.

FIG. 2 is a side view of an example of a movable charge arm in an idle position of the system in FIG. 1.

DETAILED DESCRIPTION

Figure 3A:
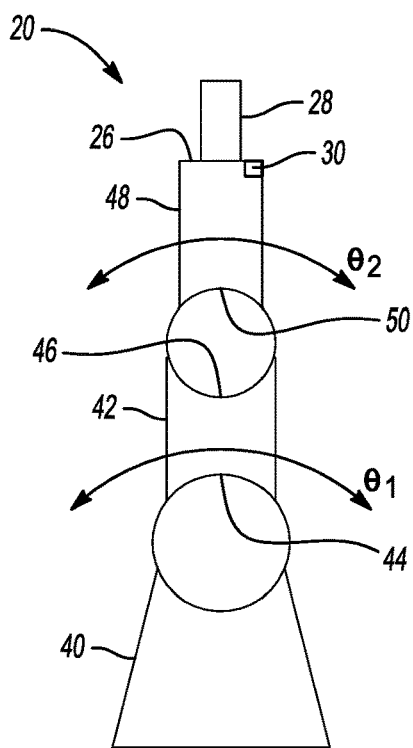
FIG. 3a is a side view of an example of a movable charge arm in a charging position of the system in FIG. 1.

The following description is merely exemplary in nature and is not intended to limit the present disclosure, application, or uses.

The present disclosure provides systems and methods of autonomously charging electric vehicles. The systems and methods disclosed herein provide more efficient, more cost effective, and safer way to charge electric vehicles with less energy loss (vs. wireless charging). The systems and methods involve a two-step alignment process before charging.

In accordance with one embodiment of the present disclosure, FIG. 1 illustrates a system 10 for autonomously charging an electric vehicle 12 having a charge port 14. As shown in FIG. 1, the system 10 comprises a movable charge arm 20 connected to an electric charger 22 via a power line 24 for powering the movable charge arm 20. As depicted in FIGS. 1-3a, the movable charge arm 20 extends to an arm end 26 comprising a charge plug 28 and a camera 30. The charge plug 28 is configured to be connected to the charge port 14 to electrically charge the electric vehicle 12. The camera 30 is configured to assist in alignment of the charge plug 28 with the charge port 14 as discussed in greater detail below. The electric charger 22 may be an AC charger, a DC charger, or any other suitable electric charger 22 without departing from the scope or spirit of the present disclosure. In this embodiment, the movable charge arm 20 is stowed in an idle position (FIG. 2) defining a charging zone and is movable to extend in a charging position (FIGS. 1 and 3a) to electrically charge the vehicle 12.

As shown in FIG. 1, the system 10 further comprises a first controller 32 disposed remote from the vehicle 12 and a second controller 34 disposed in the vehicle 12. The first controller 32 is in communication with the second controller 34 as described in greater detail below. Furthermore, the first controller 32 is connected to the electric charger 22 and the movable charge arm 20 to control charging of the vehicle 12 and movement of the movable charge arm 20.

In this embodiment, the movable charge arm 20 is movable via a predetermined degrees of freedom to connect the charge plug 28 with the charge port 14 for electrically charging the electric vehicle 12. In one example, the movable charge arm 20 is movable with four degrees of freedom. That is, the movable charge arm 20 is movable along a first rotational axis $\theta_1$, a second rotational axis $\theta_2$, an x-axis, and a y-axis relative to the view of FIG. 3a.

As shown in FIG. 3a, the movable charge arm 20 comprises a base 40 and a middle branch 42 having a first end 44 extending to a second end 46. The first end 44 of the middle branch 42 is movably connected to the base 40 and is movable about the first rotational axis $\theta_1$ relative to the view of FIG. 3a. The movable charge arm 20 further comprises an end branch 48 having a third end 50 extending to the arm end 26. As shown, the third end 50 is movably connected to the second end 46 of the middle branch 42 and is movable about the second rotational axis $\theta_2$ relative to the view of FIG. 3a.

Figure 3B:
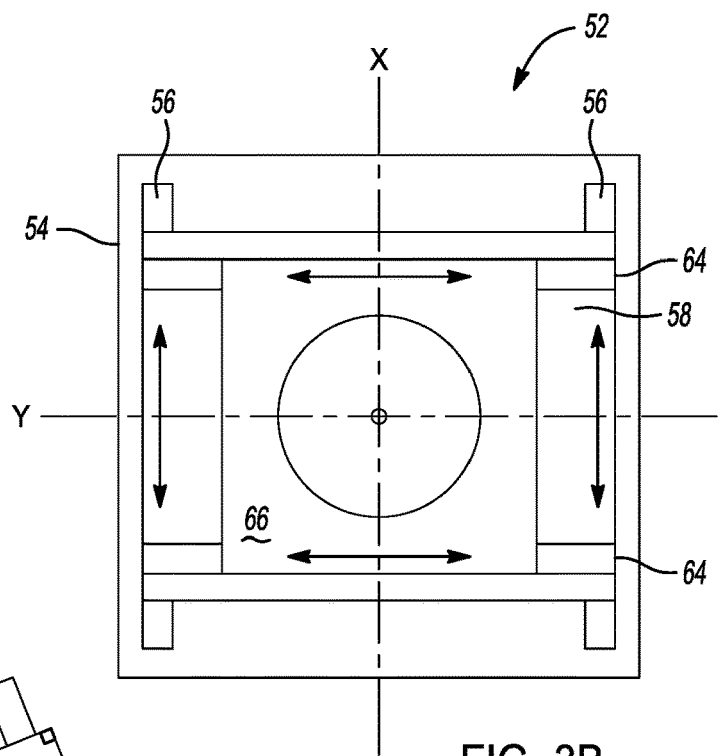
FIG. 3b is a top view of an example of a sliding mechanism of the system in FIG. 1. in accordance with one example.
Figure 3C:
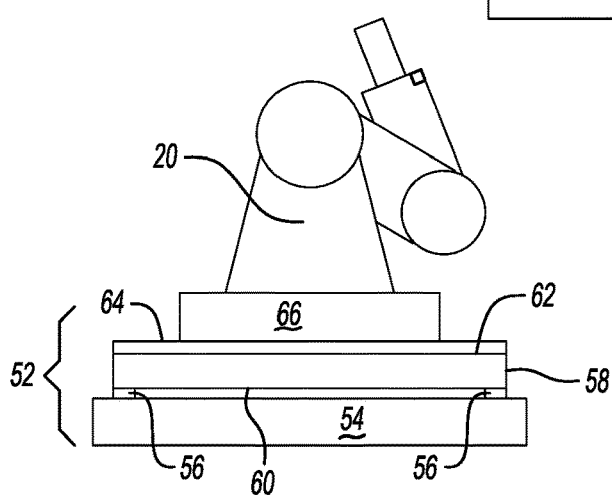
FIG. 3c is a side view of the sliding mechanism of FIG. 3b.

Moreover, the movable charge arm 20 is slidably movable along an x-axis and a y-axis relative to the view of FIG. 3a. In this example, the base 40 of the movable charge arm 20 is disposed on a sliding mechanism 52. As shown in FIGS. 3b and 3c, the sliding mechanism 52 comprises a base plate 54 having a first pair of sliders 56 disposed thereon and arranged parallel to the x-axis. A mid-plate 58 has a first side 60 and a second side 62 wherein the first side 60 is slidably disposed on the first pair of sliders 56 for linear movement parallel to the x-axis. As shown, a second pair of opposed sliders 64 are disposed on the second side 62 of the mid-plate 58 and arranged parallel to the y-axis. An end plate 66 is slidably disposed on the second pair of opposed sliders 64 for linear movement parallel to y-axis. As shown, the base 40 of the movable charge arm 20 is disposed on the end plate 66 for linear movement relative to the x-axis and the y-axis.

Rotational and linear movements of the movable charge arm 20 may be accomplished by way of servo-controlled motors (not shown) disposed adjacent or within the movable charge arm 20. In this example, at least one servo-controlled motor is in communication with the first controller 32 and is connected to the mid-plate 58 and the end plate 66 for power to linearly move the charge arm 20. Moreover, at least one servo-controlled motor is in communication with the first controller 32 and is connected to the middle branch 42 and the end branch 48 for power to rotationally move the charge arm 20. It is to be understood that movement of the movable charge arm 20 may be accomplished by any suitable matter without departing from the scope or spirit of the present disclosure. That is, any other suitable mechanism may be used to rotationally and linearly move the charge arm 20 without departing from the scope or spirit of the present disclosure.

As shown in FIG. 1, the movable charge arm 20 is disposed in an underground enclosure 70 in the idle position. The underground enclosure 70 has a housing 72 with an open end 74 for the movable charging arm to move from the idle position to the charging position. Moreover, the open end 74 includes a movable cover 76 having a closed state when the charging arm is in the idle position and an open state when the charging arm is to be moved to the charging position.

In operation, the charge port 14 is configured to be aligned with the charging zone by vehicle 12 movement defining a first alignment and the charge plug 28 is configured to be aligned with the charge port 14 by movement of the movable charge arm 20 defining a second alignment. In one example, the second controller 34 is configured to send a first signal to the first controller 32 when the charge port 14 is aligned with the charging zone in the first alignment. Preferably, the charge port 14 is aligned with the charging zone by any suitable means of moving the vehicle 12 and confirming alignment. For example, the charge port 14 may be aligned with the charging zone by way of a driver maneuvering the vehicle 12 such that the charge port 14 is within, or in relative close proximity, to the charge zone. A camera (not shown) disposed adjacent the charge port 14 may transmit signals to a display in the driver position of the vehicle 12 such that alignment is confirmed. However, it is understood that any other suitable means of moving the vehicle 12 and confirming alignment of the charge port 14 with the charging zone may be implemented without departing from the scope or spirit of the present disclosure.

When the first signal is received by the first controller 32, the charge arm 20 is configured to move from the idle position towards the charge port 14 to align the charge plug 28 with the charge port 14 in the second alignment. The camera 30 on the arm end 26 is activated to sense the alignment of the charge plug 28 and the charge port 14. When the camera 30 senses the alignment of the charge plug with the charge port, the charge arm 20 is configured to connect the charge plug 28 to the charge port 14. The camera 30 on the arm end 26 is activated to assist to connect the charge plug 28 to the charge port 14.

When charging is complete, the second controller 34 is configured to send a second signal to the first controller 32. When the second signal is received, the charge arm 20 is configured to move to the idle position. Again, the camera 30 is activated to assist in disconnecting the charge plug 28 from the charge port 14.

Figure 4:
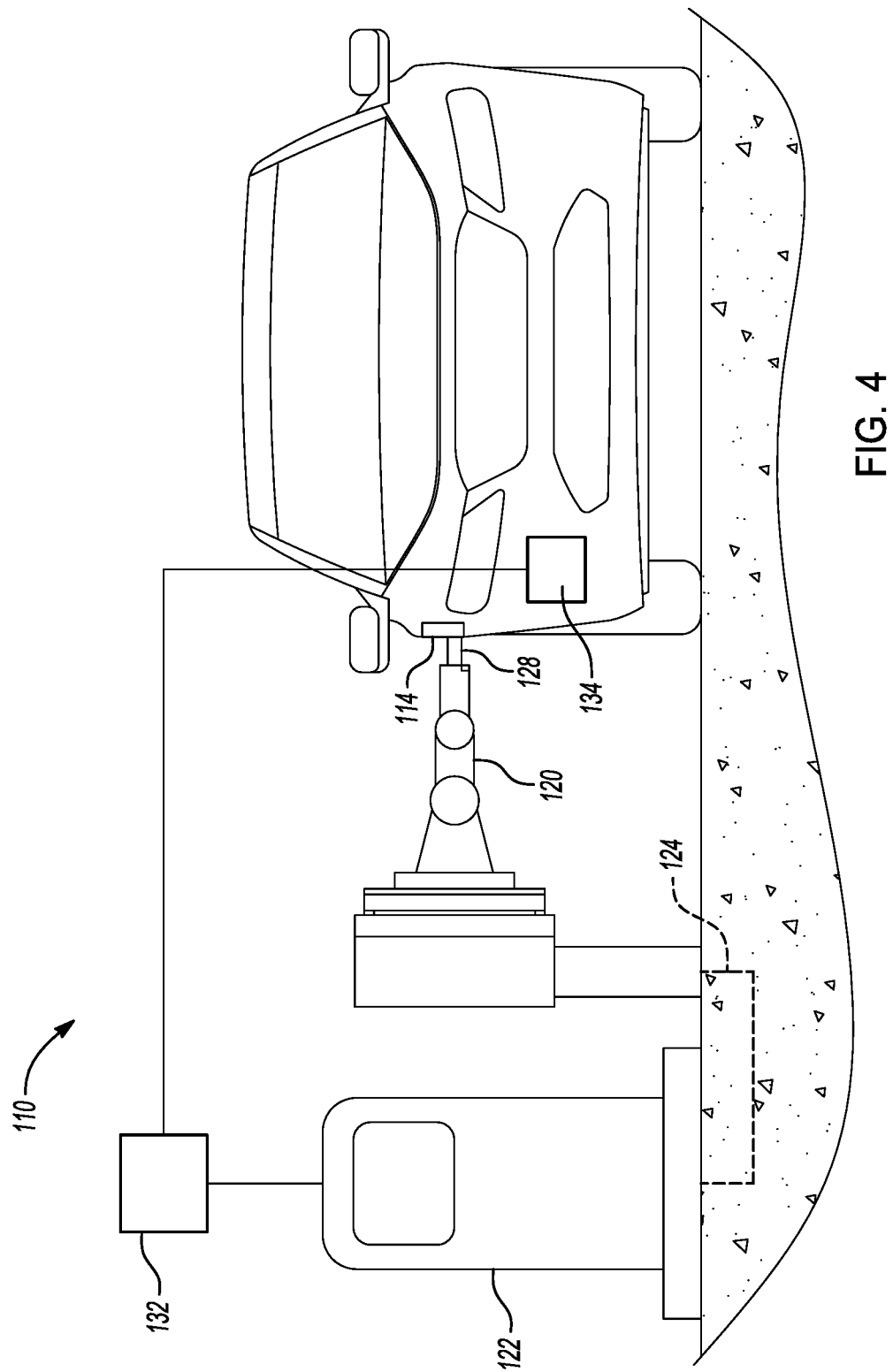
FIG. 4 is a schematic view of a system for autonomously charging an electric vehicle in accordance with another embodiment of the present disclosure.

In accordance with another embodiment of the present disclosure, FIG. 4 illustrates a system 110 for autonomously charging an electric vehicle 12 having a charge port 114. As shown, the system 110 comprises the same or similar components as the system 10 in FIG. 1. For example, the system 110 in FIG. 4 comprises a movable charge arm 120, an electric charger 122, a first controller 132 and a second controller 134 similar to the movable charge arm 20, the electric charger 22, the first controller 32, and the second controller 34 of the system 10 in FIG. 1. As depicted in FIG. 4, the movable charge arm 120 is disposed above-ground. The above-ground system 110 has the same or similar mechanism for moving the movable charge arm 120.

Figure 5:
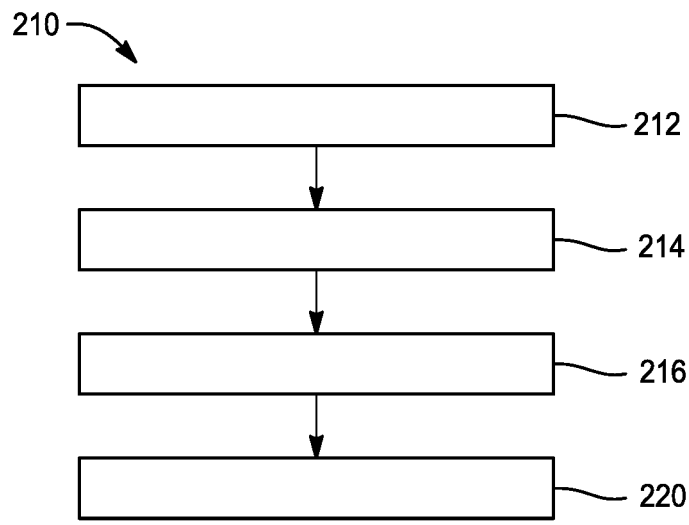
FIG. 5 is a flowchart of a method of autonomously charging an electric vehicle in accordance with one example of the present disclosure.

FIG. 5 illustrates a method 210 of autonomously charging an electric vehicle 12 having a charge port 14 in accordance with one example of the present disclosure. As shown, the method 210 comprises in box 212 providing an electric charge system 10. In this example, the electric charge system 10 is the system 10 of FIG. 1. That is, the electric charge system 10 comprises components discussed above such as the first controller 32, the second controller 34, the electric charge, and the movable charge arm 20.

As discussed above, the first controller 32 is in communication with the electric charger 22 and the movable charge arm 20. The movable charge arm 20 is connected to the electric charger 22 and extends to the arm end 26. The arm end 26 comprises the charge plug 28 and the camera 30. The movable charge arm 20 has the idle position defining the charging zone and is movable via a predetermined number of degrees of freedom to connect the charge plug 28 with the charge port 14 for electrically charging the electric vehicle 12. The second controller 34 is disposed in the vehicle 12 and is in communication with the first controller 32.

In this example, the method 210 further comprises in box 214 aligning the charge port 14 with the charging zone by vehicle 12 movement defining a first alignment. Preferably, the charge port 14 is aligned with the charging zone by any suitable means of moving the vehicle 12 and confirming alignment. For example, the charge port 14 may be aligned with the charging zone by way of a driver maneuvering the vehicle 12 such that the charge port 14 is within, or in relative close proximity, to the charge zone. A camera disposed adjacent the charge port 14 may transmit signals to a display in the driver position of the vehicle 12 such that alignment is confirmed. However, it is understood that any other suitable means of moving the vehicle 12 and confirming alignment of the charge port 14 with the charging zone may be implemented without departing from the scope or spirit of the present disclosure. When the charge port 14 is aligned with the charging zone in the first alignment, the second controller 34 sends a first signal to the first controller 32.

Moreover, the method 210 further comprises in box 216 aligning the charge plug 28 with the charge port 14 defining a second alignment. In this example, when the first signal is received by the first controller 32, the charge arm 20 is moved from the idle position towards the charge port 14 to align the charge plug 28 with the charge port 14 in the second alignment. Preferably, the camera 30 or sensor on the arm end 26 is activated to sense the alignment of the charge plug 28 and the charge port 14 (second alignment). In this example, the camera 30 on the arm end 26 senses when the charge plug 28 is aligned with the charge port 14. Alternatively, the camera on the vehicle 12 may sense when the charge plug 28 is aligned with the charge port 14.

Moreover, the method 210 further comprises in box 220 connecting the charge plug 28 to the charge port 14 to electrically charge the electric vehicle 12. In this example, when the camera 30 senses alignment of the charge plug 28 to the charge port 14, the charge arm 20 is moved to connect the charge plug 28 to the charge port 14. Preferably, the camera 30 on the arm end 26 is activated to assist in connecting the charge plug 28 to the charge port 14.

When charging is complete, the second controller 34 may send a second signal to the first controller 32. When the second signal is received, the charge arm 20 is moved to disconnect the charge plug 28 from the charge port 14 and is moved to the idle position. Again, the camera 30 is activated to assist in disconnecting the charge plug 28 from the charge port 14.

Figure 6:
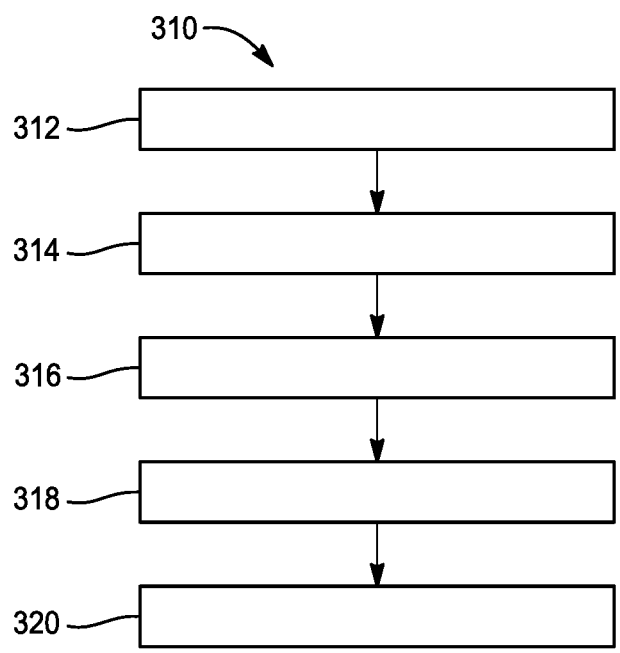
FIG. 6 is a flowchart of a method of autonomously charging an electric vehicle in accordance with another example of the present disclosure.

FIG. 6 depicts a method 310 of autonomously charging an electric vehicle 12 having a charge port 14 in accordance with another example of the present disclosure. As shown, the method 310 comprises in box 312 providing an electric charge system 10. In this example, the electric charge system 10 is the system 10 of FIG. 1. That is, the electric charge system 10 comprises components discussed above such as the first controller 32, the second controller 34, the electric charge, and the movable charge arm 20.

As discussed above, the first controller 32 is in communication with the electric charger 22 and the movable charge arm 20. The movable charge arm 20 is connected to the electric charger 22 and extends to the arm end 26. The arm end 26 comprises the charge plug 28 and the camera 30. The movable charge arm 20 has the idle position defining the charging zone and is movable via a predetermined number of degrees of freedom to connect the charge plug 28 with the charge port 14 for electrically charging the electric vehicle 12. The second controller 34 is disposed in the vehicle 12 and is in communication with the first controller 32.

In this example, the method 310 further comprises in box 314 aligning the charge port 14 with the charging zone by vehicle 12 movement defining a first alignment. Preferably, the charge port 14 is aligned with the charging zone by any suitable means of moving the vehicle 12 and confirming alignment. For example, the charge port 14 may be aligned with the charging zone by way of a driver maneuvering the vehicle 12 such that the charge port 14 is within, or in relative close proximity, to the charge zone. A video camera 30 disposed adjacent the charge port 14 may transmit signals to a display in the driver position of the vehicle 12 such that alignment is confirmed. However, it is understood that any other suitable means of moving the vehicle 12 and confirming alignment of the charge port 14 with the charging zone may be implemented without departing from the scope or spirit of the present disclosure.

Moreover, the method 310 further comprises in box 316 sending a first signal to the first controller 32 when the charge port 14 is aligned with the charging zone. That is, when the charge port 14 is aligned with the charging zone in the first alignment, the second controller 34 sends the first signal to the first controller 32.

In this example, when the first signal is received by the first controller 32, the method 310 further comprises in box 318 moving the charge arm 20 from the idle position towards the charge port 14 to align the charge plug 28 with the charge port 14 in the second alignment. Preferably, the camera 30 or sensor on the arm end 26 is activated to sense the alignment of the charge plug 28 and the charge port 14 (second alignment). In this example, the camera 30 on the arm end 26 senses when the charge plug 28 is aligned with the charge port 14. Alternatively, the camera on the vehicle 12 may sense when the charge plug 28 is aligned with the charge port 14.

In this example, the method 310 further comprises in box 320 connecting the charge plug 28 to the charge port 14 to electrically charge the electric vehicle 12. Preferably, when the camera 30 on the arm end 26 senses alignment of the charge plug 28 to the charge port 14, the charge arm 20 is moved to connect the charge plug 28 to the charge port 14. Moreover, the camera 30 on the arm end 26 is activated to assist in connecting the charge plug 28 to the charge port 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of autonomously charging an electric vehicle having a charge port, the method comprising:
   providing an electric charge system having a first controller and a second controller, the first controller in communication with an electric charger and a movable charge arm, the movable charge arm connected to the electric charger and extending to an arm end, the arm end comprising a charge plug and a camera, the movable charge arm having an idle position defining a charging zone and being movable via a predetermined number of degrees of freedom to connect the charge plug with the charge port for electrically charging the electric vehicle, the second controller disposed in the vehicle and in communication with the first controller;
   aligning the charge port with the charging zone by vehicle movement;
   aligning the charge plug with the charge port by the charge arm movement; and
   connecting the charge plug to the charge port to electrically charge the electric vehicle.

2. The method of claim 1 wherein the step of aligning the charge port with the charging zone comprises:
   sending a first signal to the first controller when the charge port is aligned with the charging zone;
   when the first signal is received, moving the charge arm from the idle position towards the charge port to align the charge plug with the charge port.

3. The method of claim 1 wherein the step of connecting the charge plug to the charge port comprises connecting the charge plug to the charge port when the charge port is aligned with the charge plug.

4. The method of claim 1 wherein the step of connecting the charge plug to the charge port comprises:
   sending a second signal to the first controller when charging is complete; and
   when the second signal is received, moving the charging arm to the idle position.

5. The method of claim 1 wherein the predetermined number of degrees of freedom of the movable charge arm is 3.

6. The method of claim 1 wherein the predetermined number of degrees of freedom of the movable charge arm is 4.

7. The method of claim 1 wherein the movable charge arm is disposed in an underground enclosure in the idle position, the underground enclosure having a housing with an open end for the movable charging arm to move from the idle position to a charging position, the open end including a movable cover having a closed state when the charging arm is in the idle position and an open state when the charging arm is to be moved to the charging position.

8. A method of autonomously charging an electric vehicle having a charge port, the method comprising:
   providing an electric charge system having a first controller and a second controller, the first controller in communication with an electric charger and a movable charge arm, the movable charge arm connected to the electric charger, the movable charge arm extending to an arm end, the arm end comprising a charge plug and a camera, the movable charge arm having an idle position defining a charging zone and being movable via a predetermined number of degrees of freedom to connect the charge plug with the charge port for electrically charging the electric vehicle, the second controller disposed in the vehicle and in communication with the first controller;

aligning the charge port with the charging zone by vehicle movement;

sending a first signal to the first controller when the charge port is aligned with the charging zone;

when the first signal is received, moving the charge arm from the idle position towards the charge port to align the charge plug with the charge port;

connecting the charge plug to the charge port to electrically charge the electric vehicle.

9. The method of claim 8 wherein the step of moving the charge arm comprises aligning the charge plug with the charge port.

10. The method of claim 9 wherein the step of connecting the charge plug to the charge port comprises:

connecting the charge plug to the charge port to electrically charge the electric vehicle, when the charge plug is aligned with the charge port;

sending a second signal to the first controller when charging is complete; and when the second signal is received, moving the charging arm to the idle position.

11. The method of claim 8 wherein the predetermined number of degrees of freedom of the movable charge arm is 3.

12. The method of claim 8 wherein the predetermined number of degrees of freedom of the movable charge arm is 4.

13. A system for autonomously charging an electric vehicle having a charge port, the system comprising:

a movable charge arm connected to an electric charger for powering the movable charge arm, the movable charge arm extending to an arm end comprising a charge plug and a camera, the movable charge arm having an idle position defining a charging zone and being movable via a predetermined degrees of freedom to connect the charge plug with the charge port for electrically charging the electric vehicle;

a first controller in communication with the electric charger and the movable charge arm;

a second controller disposed in the vehicle and in communication with the first controller;

wherein the first controller is in communication with the electric charger and the movable charge arm and wherein the charge port is configured to be aligned with the charging zone by vehicle movement, wherein the charge plug is configured to be aligned with the charge port by movement of the charge arm and wherein the charge plug is configured to be connected to the charge port to electrically charge the electric vehicle.

14. The system of claim 13 wherein the second controller is configured to send a first signal to the first controller when the charge port is aligned with the charging zone and wherein the charge arm is configured to move from the idle position towards the charge port to align the charge plug with the charge port when the first signal is received.

15. The system of claim 14 wherein the charge arm is configured to connect the charge plug to the charge port when the charge plug is aligned with the charge port.

16. The system of claim 15 wherein the second controller is configured to send a second signal to the first controller when charging is complete and, wherein the charge arm is configured to move to the idle position when the second signal is received.

17. The system of claim 13 wherein the predetermined number of degrees of freedom of the movable charge arm is 3.

18. The system of claim 13 wherein the predetermined number of degrees of freedom of the movable charge arm is 4.

19. The system of claim 13 wherein the movable charge arm is disposed in an underground enclosure in the idle position, the underground enclosure having a housing with an open end for the movable charging arm to move from the idle position to a charging position, the open end including a movable cover having a closed state when the charging arm is in the idle position and an open state when the charging arm is to be moved to the charging position.

20. The system of claim 13 wherein the movable charge arm is disposed in an above ground enclosure in the idle position, the above-ground enclosure having a housing with an open end for the movable charging arm to move from the idle position to a charging position, the open end including a movable cover having a closed state when the charging arm is in the idle position and an open state when the charging arm is to be moved to the charging position.

* * * * *